(12) United States Patent
Mueller et al.

(10) Patent No.: US 8,296,043 B2
(45) Date of Patent: Oct. 23, 2012

(54) METHOD AND DEVICE FOR MONITORING A FUNCTIONAL CAPACITY OF AN ENGINE CONTROLLER OF AN INTERNAL COMBUSTION ENGINE

(75) Inventors: Bernd Mueller, Leonberg (DE); Volker Pitzal, Waldstetten/Wissgoldingen (DE); Rainer Gmehlich, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 779 days.

(21) Appl. No.: 12/308,184

(22) PCT Filed: Sep. 19, 2007

(86) PCT No.: PCT/EP2007/059904
§ 371 (c)(1),
(2), (4) Date: May 19, 2009

(87) PCT Pub. No.: WO2008/043650
PCT Pub. Date: Apr. 17, 2008

(65) Prior Publication Data
US 2010/0004841 A1    Jan. 7, 2010

(30) Foreign Application Priority Data
Oct. 10, 2006  (DE) .................. 10 2006 048 169

(51) Int. Cl.
*G06F 19/00* (2006.01)
*G06F 11/30* (2006.01)
*G05B 9/02* (2006.01)
(52) U.S. Cl. .......... 701/114; 701/107; 700/79; 702/183; 702/189

(58) Field of Classification Search .............. 123/198 D, 123/406.13, 479, 568.16, 630, 690; 701/29.1, 701/29.2, 101–103, 107, 111, 114, 115; 702/182–185, 189; 73/114.58, 114.61; 700/79, 700/81
See application file for complete search history.

(56) References Cited

U.S. PATENT DOCUMENTS

| | | | |
|---|---|---|---|
| 4,780,826 A * | 10/1988 | Nakano et al. | 701/101 |
| 5,601,063 A | 2/1997 | Ohashi et al. | |
| 5,838,896 A * | 11/1998 | Han | 714/23 |
| 6,305,347 B1 | 10/2001 | Russell | |
| 6,678,640 B2 * | 1/2004 | Ishida et al. | 702/189 |
| 6,705,286 B1 | 3/2004 | Light et al. | |
| 6,751,544 B2 * | 6/2004 | Hashimoto et al. | 701/114 |
| 6,778,867 B1 * | 8/2004 | Ziegler et al. | 700/79 |
| 7,200,508 B2 * | 4/2007 | Geyer et al. | 702/185 |
| 7,260,319 B2 * | 8/2007 | Watanabe et al. | 318/400.13 |
| 7,603,980 B2 * | 10/2009 | Watanabe | 701/114 |
| 2004/0054429 A1 * | 3/2004 | Doi et al. | 700/79 |
| 2004/0055568 A1 | 3/2004 | Light et al. | |

FOREIGN PATENT DOCUMENTS

| | | |
|---|---|---|
| DE | 199 00 740 | 7/2000 |
| DE | 199 28 477 | 12/2000 |
| DE | 10 2006 003425 | 8/2006 |

(Continued)

*Primary Examiner* — Willis R Wolfe, Jr.
(74) *Attorney, Agent, or Firm* — Kenyon & Kenyon LLP

(57) ABSTRACT

In a method for monitoring the functional capacity of an engine controller having a plurality of execution units, a comparison operating mode is provided, in which a torque monitoring program is executed on a plurality of execution units of the system, and signals outputted during the execution of the monitoring program by the execution units are compared with one another in order to recognize an error.

14 Claims, 3 Drawing Sheets

FOREIGN PATENT DOCUMENTS

| | | |
|---|---|---|
| JP | 2001-20803 | 1/2001 |
| WO | WO2006/045773 | 5/2006 |
| WO | WO2006/045774 | 5/2006 |
| WO | WO2006/045775 | 5/2006 |
| WO | WO2006/045776 | 5/2006 |
| WO | WO2006/045777 | 5/2006 |
| WO | WO2006/045778 | 5/2006 |
| WO | WO2006/045779 | 5/2006 |
| WO | WO2006/045780 | 5/2006 |
| WO | WO2006/045781 | 5/2006 |
| WO | WO2006/045782 | 5/2006 |
| WO | WO2006/045784 | 5/2006 |
| WO | WO2006/045785 | 5/2006 |
| WO | WO2006/045788 | 5/2006 |
| WO | WO2006/045789 | 5/2006 |
| WO | WO2006/045790 | 5/2006 |

* cited by examiner

METHOD AND DEVICE FOR MONITORING A FUNCTIONAL CAPACITY OF AN ENGINE CONTROLLER OF AN INTERNAL COMBUSTION ENGINE

BACKGROUND OF THE INVENTION

1. Field of the Invention

The present invention relates to a method for monitoring a functional capacity of a controller running on a system having a plurality of execution units.

2. Description of Related Art

In the area of embedded systems, in particular in automotive engineering or automation technology, there are many applications or application programs in which an error in the hardware has consequences that are potentially safety-relevant. In order to avoid these consequences or to reduce their effects, monitoring measures are therefore used to detect such errors. There are applications in which such monitoring is required almost permanently. In other applications, monitoring functions are used that monitor regularly, for example periodically, or that check whether the data processing system or other hardware components are still functioning correctly in response to a particular request.

FIG. 1 shows the structure of a conventional monitoring method in an engine controller. In an engine controller, an injection system is used to inject fuel into a combustion chamber. From the point of view of safety, this exemplary application of an engine controller is structured in three levels E1, E2, E3. The application programs of the injection controller form a base level E1 that contains the actual functions that are to be carried out. The injection controller indicates how much fuel is to be injected into the combustion chamber at precisely what time. If there is a failure of the injection controller, the injection controller may inject too much fuel into the combustion chamber, or may inject fuel constantly into the combustion chamber, so that the motor vehicle accelerates very rapidly, possibly causing an accident. Therefore, in a conventional system a monitoring level E2 is provided that monitors whether the injection controller is operating without error on level E1. Monitoring level E2 is formed by additional programs or an additional software code that accesses additional sensors if warranted. In a conventional engine controller, monitoring level E2 is as a rule formed by a continuous torque monitoring system that monitors whether the torque currently produced by the engine exceeds a determined threshold value. In a conventional engine controller, the programs of injection control level E1 and monitoring level E2 run on the same hardware, or on the same execution units. Because the application programs of the injection controller in level E1 and the application programs of the torque monitoring system in level E2 run on the same execution unit or CPU, a hardware error in the execution unit can have the result that the injection controller and the torque monitoring system fail simultaneously. Therefore, in conventional engine controllers for safety reasons another safety level E3 is provided that monitors whether monitoring level E2 is functioning correctly. Safety level E3 carries out a query-response communication of the execution unit with an external hardware component, for example an ASIC, fundamentally monitoring the functional capacity of the execution unit or of the microcontroller, in particular the functioning of the application programs within monitoring level E2. The application programs of monitoring level E2 carry out a plausibility test. For example, the monitoring programs of monitoring level E2 read in an angular position α of the gas pedal. If the quantity of fuel indicated by the application programs of injection controller level E1 exceeds a particular threshold value that is a function of the gas pedal position monitored by sensors, the monitoring program running on level E2 recognizes that an error has occurred in the injection controller, and as a rule then causes the engine to switch off for safety reasons. Monitoring level E2 for example also contains a torque monitoring program that monitors the torque produced on the engine, and that shuts off the engine if a threshold value is exceeded. For the implementation of the monitoring function, the code of the monitoring programs is stored in duplicate form as E2'. The algorithm or program of E2' is run using default data or test data. The program of safety level E3, which runs for example on an ASIC, i.e. a user-specific integrated circuit, supplies a particular bit pattern as a query to the execution unit or CPU, which executes the monitoring program, present as a copy, according to level E2' using this default value, and outputs a response bit pattern to the safety program of level E3 in the user-specific integrated circuit ASIC. The safety program compares the response bit pattern with a reference bit pattern in order to determine whether the monitoring program is still functioning without error in the CPU. The safety program within the user-specific integrated circuit runs on different hardware, namely on the ASIC, than does the monitoring program, which runs on an execution unit or CPU. Therefore, this conventional procedure provides a certain degree of safety against hardware errors within the CPU.

However, as is shown in FIG. 1, a disadvantage of the conventional safety design is that the monitoring programs for the command test for execution using default or test values have to be present in duplicate. Therefore, the memory space for storing the duplicate program commands is required on monitoring level E2'.

Another disadvantage of the conventional command test in which default or test data are used as input data for the duplicate of monitoring program E2' is that errors that are a function of the operand are not detected.

BRIEF SUMMARY OF THE INVENTION

An object of the present invention is to create a method for monitoring the functional capacity of a controller that also detects operand-dependent errors.

The present invention provides a method for monitoring the functional capacity of a controller that runs on a system having a plurality of execution units, a monitoring program being executed in a comparison operating mode VM on a plurality of execution units of the system, and the signals outputted by these execution units during the execution of the monitoring program being compared to one another in order to recognize an error.

An advantage of the method according to the present invention is that no memory space is wasted on duplicate program commands of a monitoring program.

In a specific example embodiment of the method according to the present invention, the monitoring program is formed by a torque monitoring program that monitors a torque produced by an engine.

In a specific example embodiment of the method according to the present invention, the controller is an engine controller.

In a specific example embodiment of the method according to the present invention, the monitoring program is executed synchronously on the execution units.

In an alternative specific example embodiment of the method according to the present invention, the monitoring program is executed asynchronously on the execution units.

In a specific example embodiment of the method according to the present invention, after successful execution of the monitoring program the system switches over to a performance operating mode in which the execution units execute different programs.

In a specific example embodiment of the method according to the present invention, the programs executed in performance operating mode carry out the controlling.

In a specific example embodiment of the method according to the present invention, the monitoring program is executed periodically.

In a specific example embodiment of the method according to the present invention, an error is recognized during the execution of the monitoring program if the signals outputted by the execution units during the execution of the monitoring program differ from one another.

In a specific example embodiment of the method according to the present invention, after recognition of an error during the execution of the monitoring program a unit controlled by the controller is switched off.

In addition, the present invention provides a controller having a plurality of execution units, a monitoring program being executed on a plurality of execution units in a comparison operating mode VM, and the signals outputted by the execution units during execution of the monitoring program being compared with one another in order to recognize an error.

In a specific example embodiment of the controller according to the present invention, the monitoring program is a torque monitoring program that monitors a torque produced by an engine.

In a specific example embodiment of the controller according to the present invention, the controller is an engine controller.

In a specific example embodiment of the controller according to the present invention, the execution units are formed by a microprocessor, a co-processor, a digital signal processor DSP, a floating-point computing unit FPU, or by an arithmetic logical unit ALU.

BRIEF DESCRIPTION OF THE SEVERAL
VIEWS OF THE DRAWINGS

DETAILED DESCRIPTION OF THE INVENTION

Figure 2:
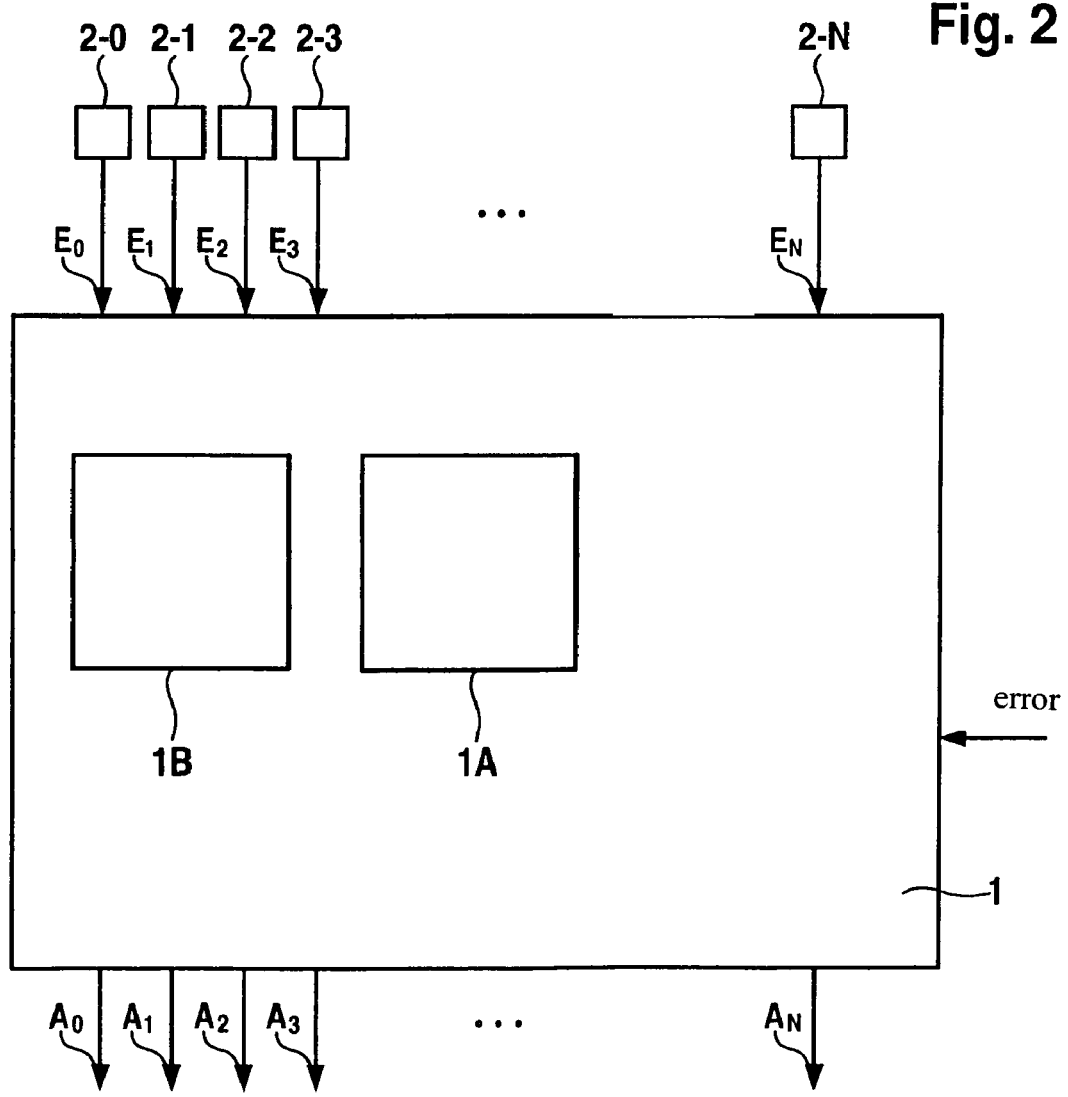
FIG. 2 shows a block diagram of a changeover and comparator unit used in the method according to the present invention.

As can be seen in FIG. 2, a changeover and comparator circuit 1 is connected at the input side to N+1 execution units 2, and receives logical input signals $E_0, E_1, E_2, E_3, \ldots E_N$ from execution units 2-$i$. The changeover and comparator unit 1 contains a comparator logic unit 1A and a circuit logic 1B.

The system shown in FIG. 2 can be operated in at least two operating modes. In a first operating mode for increasing performance, also called performance operating mode PM, execution units 1-$i$, or cores, process different programs or tasks in parallel. Execution units 2-$i$ may be arbitrary execution units 2-$i$ for executing a computing instruction, in particular a processor, a floating-point computing unit FPU, a digital signal processor DSP, a co-processor, or an arithmetic logical computing unit ALU. The execution of the programs by the various execution units 2-$i$ in performance mode PM may be carried out synchronously or asynchronously. In performance mode, no redundant processing takes place; rather, execution units 2-$i$ carry out different calculations or programs in parallel. In pure performance operating mode PM, all input signals $E_i$ are switched or routed to corresponding output signals $A_j$.

In addition to the use of a superscalar computing system, the second reason for a multi-core architecture is to increase the reliability of the signal processing by having a plurality of execution units 2-$i$ redundantly execute the same program. In this second operating mode, also called safety mode or comparison operating mode VM, the results or logical output signals of the execution units are compared to one another by changeover and comparator circuit 1, so that an error or signal deviation can be recognized by carrying out a comparison for agreement. In pure comparison operating mode VM, all input signals $E_i$ are therefore routed or mapped onto only exactly one output signal $A_j$. Mixed forms are possible. In configurable switching logic 1B, it is indicated how many output terminals or output signals $A_j$ are provided. In addition, in switching logic 1B information is stored indicating which input signals $E_i$ contribute to which output signals $A_j$. Thus, in switching logic 1B a mapping function is stored that allocates input signals $E_i$ to various output signals $A_j$.

For each output signal $A_j$, processing logic 1A defines the form in which the input signals contribute to the respective output signal. For example, output signal $A_0$ is produced by input signals $E_1, E_2, E_3, \ldots E_N$. For m=1, this corresponds simply to a through-switching of an input signal. For M=2, two input signals $E_1, E_2$ are compared with each other. This comparison can be carried out synchronously or asynchronously by circuit 1. The comparison can take place bit-by-bit, or, alternatively, only significant bits may be compared to one another. For M≧3, there are various possibilities. A first possibility is that all the signals are compared with each other, and if at least two differing values are present an error is detected, which is optionally signaled by changeover and comparator circuit 1. Another possibility is that a K from m selection is carried out, where K>M/2. In a specific embodiment, this is realized by providing comparators. Here, a first error signal is optionally generated if one of the input signals is recognized as deviating from the other input signals. Given a second error signal different from the first error signal, all three input signals may deviate from each other. In another specific embodiment, the input signal values are supplied to another computing unit that for example calculates an average value or a median value, or executes an error-tolerant algorithm FTA. In an error-tolerant algorithm, the extreme values of the input signal values are deleted or ignored, and the rest of the signal values are averaged. In a specific embodiment, the averaging takes place over the entire set of the remaining signal values. In an alternative specific embodiment, an averaging takes place over a subset, which is easy to form in the hardware, of the remaining signal values. While the average value formation requires only an addition and a division, FTM, FTA, or median value formation require a partial sorting of the input signal values. In a specific embodiment, given sufficiently large signal deviations or extreme values, an error signal is optionally outputted or displayed. The various possibilities mentioned for signal processing of a signal represent comparison operations. Comparator logic 1A defines the precise design of the comparison operations to be carried out for each output signal $A_j$, and thus also for input signals $E_i$. The combination of the items of information inside switching logic 1B, i.e., the assignment function of the comparison operations indicated in processing logic 1A per output signal or per function value, represents an item of operating mode information, and defines the operating mode. As a rule, this information is multivalent and is represented by more than one logical bit. For the case in which only two execution units 2-$i$ are provided, so that only a comparison mode exists, all the information can be compensated to a single logical bit in the operating mode.

A changeover of the system from performance operating mode PM to comparison operating mode VM generally takes place in that execution units 2-$i$, which in performance operating mode PM are mapped or switched through to various signal outputs, are mapped or switched through to the same signal output in comparison operating mode VM. This is preferably realized in that a subset of execution units 2-$i$ are provided in which, in performance operating mode PM, all input signals $E_i$ that are to be taken into account in the subset are switched directly to corresponding output signals $A_j$, while in comparison mode VM the input signals are all mapped or switched through to a single signal output. Alternatively, a changeover can be realized by modifying pairings.

Changeovers between the various operating modes can take place dynamically during running operation, controlled by the software. In a specific embodiment, the changeover is triggered by the execution of special changeover commands or changeover instructions, special instruction sequences, explicitly designated instructions, or by access to particular addresses by at least one of the execution units 2-$i$ of the system.

The changeover between safety mode VM, in which a redundant execution and testing takes place, and performance operating mode PM, in which an increase in performance is achieved by separate program execution, is carried out by changeover device 1. In a specific embodiment, for the changeover there takes place a designation of the programs, application programs, program parts, or program commands using an identifier that makes it possible to recognize whether these program commands are safety-relevant, i.e. whether they have to be executed in safety, or comparison, operating mode VM, or can be made accessible to performance operating mode PM. The designation can take place using a bit in the program command. Alternatively, a special program command can be used to identify the next following sequence.

In safety mode VM, the calculation of the results or output signals of execution units 2-$i$ lasts the same amount of time given synchronous processing on the various execution units 2-$i$. The results are then simultaneously available in safety mode VM, given synchronous execution of changeover device 1. If the results agree, the corresponding data are released. If there is a signal deviation, a prespecified error reaction takes place.

If the system is in performance operating mode PM, the programs are executed in parallel, and comparators, or comparisons, are not controlled within changeover and comparator circuit 1.

In the method according to the present invention for monitoring the functional capacity of a controller running on a system having a plurality of execution units 2, at least one monitoring program is executed in a comparison operating mode VM on a plurality, or even on all, execution units of the system. The signals outputted by these execution units 2 during the execution of the monitoring program are compared with one another in order to recognize an error. In a preferred specific embodiment of the controller according to the present invention, this controller has at least three execution units 2. The signal having the greatest deviation from the other signals is recognized as errored, for example on the basis of a majority decision. In a specific embodiment, the signals are digital logical signals, in particular binary signals. Controller 4 according to the present invention is, in a preferred specific embodiment, an engine controller for controlling an internal combustion engine. In alternative specific embodiments, controller 4 is a controller for controlling an electric motor. The monitoring program is formed for example by a torque monitoring program that monitors a torque produced by the internal combustion engine or electric motor. The monitoring program can be executed synchronously or asynchronously on execution units 2.

In the method according to the present invention, the normal application programs for engine controlling are executed in performance operating mode PM; i.e., each execution unit 2 of the system executes a program for controlling in order to increase performance, while the other execution units 2 execute a different application program. In a possible specific embodiment, the monitoring program running on level E2 is called periodically. In the method according to the present invention, in a comparison operating mode VM the monitoring program is executed on a plurality of execution units 2 of the system. In comparison operating mode VM, a plurality, or all, execution units 2 of the system execute the same monitoring program, the produced output signals being compared to one another in order to recognize an error. In a possible specific embodiment, a plurality of monitoring programs are executed on level E2 that for example are all called periodically. All called monitoring programs are executed in comparison operating mode VM. In an alternative specific embodiment, the monitoring programs are called in response to a particular request or request command, and are subsequently executed in comparison operating mode VM by a plurality, or at least two, execution units 2 of the system. Such a request command for the execution of the monitoring program can be triggered for example by an interrupt.

After the monitoring program has been executed, the system changes back to a performance operating mode PM, in which execution units 2 preferably execute different programs of first level $E_1$, for example control programs.

In a specific example embodiment of the method according to the present invention, an error is recognized in the execution of the monitoring program in level E2 if the signals outputted by execution units 2 during the execution of the monitoring program in comparison operating mode VM differ from one another. Here, after the recognition of an error during the execution of the monitoring program, a unit 5 controlled by controller 4, for example an engine, is preferably shut off.

Figure 3:
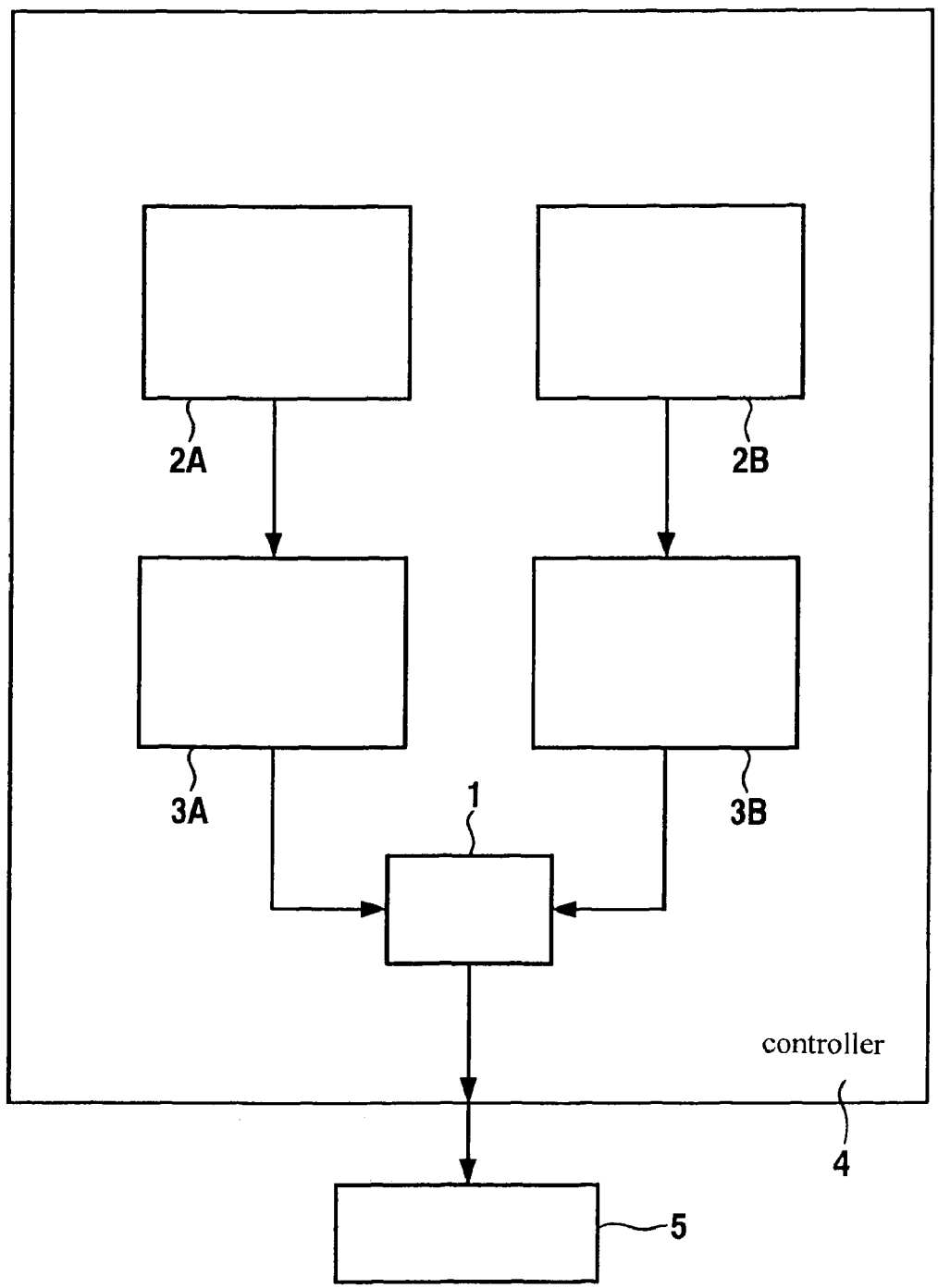
FIG. 3 shows a block diagram representing a possible specific embodiment of the controller according to the present invention.

FIG. 3 shows a block diagram of a specific example embodiment of the control system according to the present invention. In the specific embodiment shown in FIG. 3, controller 4 according to the present invention has two execution units 2A, 2B. Execution units 2A, 2B can be complete microprocessors or CPUs, co-processors, digital signal processors DSP, floating-point computing units FPU, or an arithmetic logical unit ALU. In further specific embodiments of the controller 4 according to the present invention, more than two execution units 2 are provided. In the simple specific embodiment shown in FIG. 3, the signals produced by execution units 2A, 2B are each intermediately stored in a buffer 3A, 3B. Each execution unit 2 preferably has its own buffer 3 at its output side. The intermediately stored results or output signals of execution units 2A, 2B are supplied to a comparator unit 1. Comparator unit 4 may for example be formed by changeover and comparator circuit 1 as shown in FIG. 2. The comparison of the intermediately stored output signals can be carried out by running a corresponding comparison program and software, or can be hard-wired as hardware.

Figure 4:
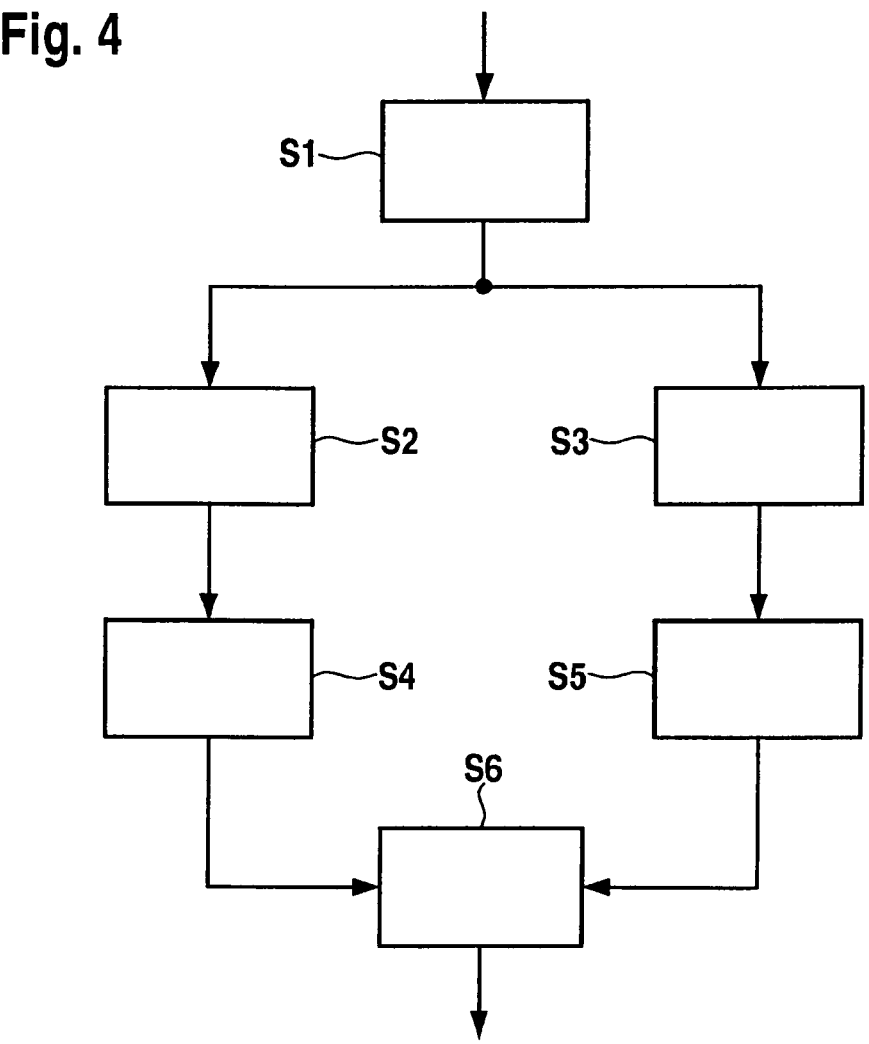
FIG. 4 shows a flow diagram for the explanation of the method according to the present invention.

FIG. 4 shows a flow diagram of a specific example embodiment of the method according to the present invention for monitoring the functional capacity of a controller.

After calling the monitoring program in second level E2, in step S1 there takes place a changeover of the system from performance operating mode PM to comparison operating mode VM. Subsequently, the two execution units 2A, 2B, as shown in FIG. 3, are activated for the execution of the same monitoring program in steps S2, S3, and execute the same monitoring program, for example a torque monitoring program. In the specific embodiment shown in FIG. 4, the two execution units 2A, 2B asynchronously calculate, in steps S2, S3, a corresponding result signal, which in steps S4, S5 is intermediately stored in the respective buffers 3A, 3B. In an alternative specific embodiment, in steps S2, S3 the two execution units 2A, 2B calculate the respective output signal or result value synchronously to one another. After the two result values or output signals are present, in step S6 a comparison of the two output signals is carried out, preferably by changeover and comparator circuit 1. If the two signals differ from one another, an error is recognized, and a corresponding error treatment subsequently takes place. In the case of a safety-relevant application, a unit 5 controlled by controller 4, for example an engine, is switched off. The comparison in step S6 can either be carried out by a corresponding comparison operation using software, after subsequent reading out from buffer 3A, 3B, or, in an alternative specific embodiment, can take place using a hard-wired circuit.

Figure 5:
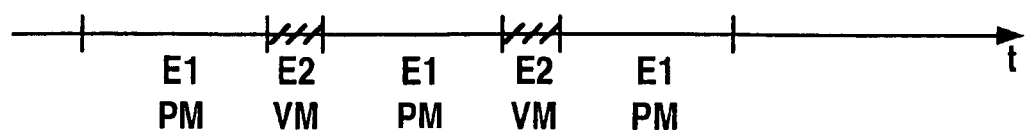
FIG. 5 shows a time-flow diagram for the explanation of a possible specific embodiment of the method according to the present invention.

FIG. 5 shows a time-flow diagram explaining a specific example embodiment of the method according to the present invention. In this specific embodiment, the monitoring program is periodically called in level E2, and is simultaneously executed in comparison operating mode VM by a plurality of execution units 2. After the execution of the monitoring program, the system returns to performance operating mode PM, and executes the actual control programs in level E1.

In an alternative specific example embodiment of controller 4 according to the present invention, controller 4 always operates in performance operating mode PM, and monitoring programs having at least two execution units 2 are calculated asynchronously. The results or output signals that are outputted by the execution units here are compared with one another for error recognition. However, in this specific embodiment the results must be intermediately stored, and the results are subsequently compared to one another twice, once on first execution unit 2A and once on second execution unit 2B, in order to take into account possible hardware errors of the two execution units 2. For this reason, this specific embodiment is more expensive than a specific embodiment in which the monitoring program is executed in comparison operating mode VM.

Figure 1:
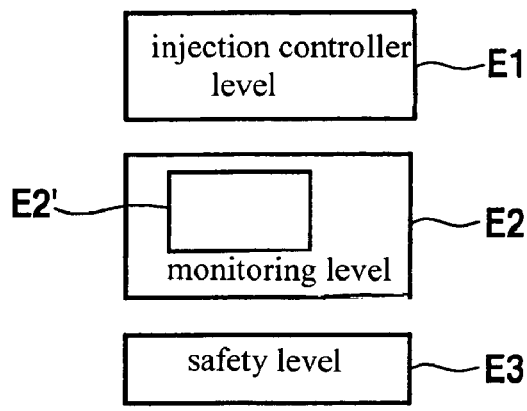
FIG. 1 shows a diagram representing a conventional safety design having three levels.

The method according to the present invention also permits the detection of operand-dependent errors. In addition, the method according to the present invention results in a significant saving of memory space compared to the conventional safety design shown in FIG. 1.

In a specific example embodiment of controller 4 according to the present invention, this controller has at least three execution units 2, and in case of a signal deviation a majority decision can be used to determine which execution unit 2 is presumed to be operating incorrectly. This execution unit 2 preferably then carries out a self-test in order to determine whether this execution unit 2 has in fact failed. In a specific embodiment, execution unit 2 is deactivated if the self-test yields the result that execution unit 2 has in fact failed. In this specific embodiment, the system thus operates in an error-tolerant manner.

In order to protect against permanent errors in the two cores or execution units 2, such as those that may arise due to a manufacturing error, in a possible specific embodiment of the method according to the present invention a self-test is carried out in each of execution units 2.

In a specific example embodiment of the method according to the present invention, the execution of monitoring programs in level E2 takes place in comparison operating mode VM, and in addition to the further protection a safety level E3 is provided that additionally executes a command test in order to monitor the functional capacity of the monitoring programs. Such a specific embodiment is suitable for particularly safety-critical applications.

What is claimed is:

1. A controller comprising:
a plurality of execution units configured to execute a monitoring program in a comparison operating mode, wherein output signals generated by the plurality of execution units during the execution of the monitoring program are compared with one another in order to determine an error.

2. The controller as recited in claim 1, wherein the monitoring program is configured as a torque monitoring program monitoring a torque produced by an engine.

3. The controller as recited in claim 1, wherein the controller is configured as an engine controller.

4. The controller as recited in claim 1, wherein the execution units are at least one of a central processing unit, a co-processor, a digital signal processor, a floating-point computing unit, and an arithmetic logic unit.

5. A method for monitoring a functional capacity of a controller in a system having a plurality of execution units, comprising:
executing a monitoring program on the plurality of execution units of the system in a comparison operating mode; and
comparing output signals generated by the plurality of execution units during the execution of the monitoring program with one another in order to determine an error.

6. The method as recited in claim 5, wherein the monitoring program executed on the plurality of execution units is a torque monitoring program monitoring a torque produced by an engine.

7. The method as recited in claim 5, wherein the controller is an engine controller.

8. The method as recited in claim 5, wherein the monitoring program is executed synchronously on the plurality of execution units.

9. The method as recited in claim 5, wherein the monitoring program is executed asynchronously on the plurality of execution units.

10. The method as recited in claim 5, wherein the monitoring program is executed periodically on the plurality of execution units.

11. The method as recited in claim 5, wherein an error is determined if the output signals generated by the plurality of execution units during the execution of the monitoring program differ from one another.

12. The method as recited in claim 11, wherein at least one operating unit controlled by the controller is switched off after the determination of the error during the execution of the monitoring program.

13. The method as recited in claim 5, further comprising:
changing over, after execution of the monitoring program, to a performance operating mode in which the plurality of execution units executes different programs.

14. The method as recited in claim 13, wherein controlling operations are carried out by the different programs executed in the performance operating mode.

* * * * *